(12) United States Patent
Dillenberger et al.

(10) Patent No.: US 8,352,950 B2
(45) Date of Patent: Jan. 8, 2013

(54) ALGORITHM TO SHARE PHYSICAL PROCESSORS TO MAXIMIZE PROCESSOR CACHE USAGE AND TOPOLOGIES

(75) Inventors: Donna N. Dillenberger, Yorktown Heights, NY (US); Jeffrey P. Kubala, Poughquag, NY (US); Bernard Pierce, Poughkeepsie, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 11/972,734

(22) Filed: Jan. 11, 2008

(65) Prior Publication Data

US 2009/0183166 A1    Jul. 16, 2009

(51) Int. Cl.
*G06F 9/46* (2006.01)
*G06F 9/455* (2006.01)

(52) U.S. Cl. .............................. 718/104; 718/1; 718/100
(58) Field of Classification Search .................. None
See application file for complete search history.

(56) References Cited

U.S. PATENT DOCUMENTS

| | | | |
|---|---|---|---|
| 6,587,938 B1 | 7/2003 | Eilert et al. | |
| 6,957,435 B2 | 10/2005 | Armstrong et al. | |
| 7,117,499 B2 | 10/2006 | Kawamoto et al. | |
| 7,774,470 B1 * | 8/2010 | Sanders et al. | 709/226 |
| 2002/0087611 A1 * | 7/2002 | Tanaka et al. | 709/1 |
| 2002/0156824 A1 * | 10/2002 | Armstrong et al. | 709/104 |
| 2004/0168170 A1 | 8/2004 | Miller | |
| 2004/0215892 A1 * | 10/2004 | Fluhr et al. | 711/137 |
| 2005/0022188 A1 * | 1/2005 | Tameshige et al. | 718/100 |
| 2006/0020944 A1 * | 1/2006 | King et al. | 718/104 |
| 2006/0130062 A1 * | 6/2006 | Burdick et al. | 718/100 |
| 2006/0136653 A1 * | 6/2006 | Traut et al. | 711/6 |
| 2007/0150894 A1 | 6/2007 | Barsness et al. | |
| 2008/0148015 A1 * | 6/2008 | Takamoto et al. | 712/203 |
| 2008/0244598 A1 * | 10/2008 | Tolopka et al. | 718/104 |

OTHER PUBLICATIONS

Kim et al, "A Virtual Physical On-Chip Cache for Shared Memory Multiprocessors", Euro-Par '97 Parallel Processing, Third International Euro-Par Conference Passau, Germany, Aug. 26-29, 1997, Proceeding, pp. 789-792 (6 pages).

Taniar et al, "Impact of Load Balancing to Object-Oriented Query Execution Scheduling in Parallel Machine Environment", Information Sciences, vol. 157 (2003), pp. 33-71.

Siegel et al, Logical Partition Mode Physical Resource Management on the IBM eServer z990, IBM J. Res. & Dev., vol. 48, No. 3/4, May/Jul. 2004, pp. 535-541.

\* cited by examiner

*Primary Examiner* — Meng An
*Assistant Examiner* — Tammy Lee
(74) *Attorney, Agent, or Firm* — Cantor Colburn LLP; William A. Kinnaman, Jr.

(57) ABSTRACT

A method and apparatus for use in a computing environment to run a variety of applications in logical partitions. The apparatus includes one or more logical processors (LPs), one or more logical partitions (LPARs) configured to each access a share of processing resources of the LPs in accordance with predefined instructions, and an LPAR manager configured to determine an operational mode of each of the LPARs and any available amount of an excess of the share of the processing resources of the LPs and to dispatch the processing resources of at least a subset of the LPs to the LPARs in accordance with the respective predetermined shares and with respect to the determined operational mode of the respective LPARs and the amount, if any, of the excess share.

22 Claims, 7 Drawing Sheets

ALGORITHM TO SHARE PHYSICAL PROCESSORS TO MAXIMIZE PROCESSOR CACHE USAGE AND TOPOLOGIES

BACKGROUND OF THE INVENTION

1. Field of the Invention

Aspects of the present invention are directed to a method and apparatus for operating logical partitions and, more particularly, to a method and apparatus for operating logical partitions to run in vertical mode.

2. Description of the Background

Recently, as high-end server architectures have been improved in terms of providing faster processing speeds and offering greater storage capacity, numbers of processors used by the servers have increased. As such, the processor "nest" needed to build large machines operating as servers continues to be made of smaller and smaller building blocks.

As these trends have continued, however, certain issues with server architectures have been made apparent. Among these is a tendency for the server to go "off node" to resolve a cache miss during the processing of an application. Here, although work may be scheduled for distribution to a particular local processor and associated cache, L1, the necessary cache line is actually resident in a remote cache, L2. The penalty for going off node to resolve the cache miss is relatively significant and continues to increase. That is, resolving the L1 miss in the remote L2 is expensive in terms of processing time as compared to resolving it in the local cache. Further, while a cache miss with respect to a local cache is expensive to start with, increases in the speed of memory access and the connections to remote memory are not keeping pace with the growth of problems arising from these issues.

Recently, solutions to the issues have been proposed and relate to the introduction of logical partitions (LPARs) and LPAR managers (or, alternately, LPAR hypervisors), which attempt to optimize the allocation of processing resources and storage resources to particular LPARs in accordance with machine topologies. Examples of these attempts include intelligent resource direction and the use of concurrent book repair methods and methods of dispatching work for certain LPARs on the same physical processors. The latter method has been effective, but for the fact that it may lead to delays if the physical processors are previously occupied with work.

Another method relates to operating LPARs "horizontally". In this method, each LPAR is assigned a share of processing resources while scheduling algorithms evenly spread the LPAR's share among physical processors (or, alternately, logical processors) to which the LPAR has access. While this method may have advantages as long as various LPARs do not have to compete for resources, if the LPARs have to compete for resources, operating LPARs in horizontal mode may be inefficient.

SUMMARY OF THE INVENTION

In accordance with an aspect of the invention, an apparatus for use in a computing environment to run a variety of applications is provided. The apparatus includes one or more logical processors (LPs), one or more logical partitions (LPARs) configured to each access a share of processing resources of the LPs in accordance with predefined instructions, and an LPAR manager configured to determine an operational mode of each of the LPARs and any available amount of an excess of the share of the processing resources of the LPs and to dispatch the processing resources of at least a subset of the LPs to the LPARs in accordance with the respective predetermined shares and with respect to the determined operational mode of the respective LPARs and the amount, if any, of the excess share.

In accordance with another aspect of the invention, a logical partition (LPAR) manager for use in a computing environment is provided. The LPAR manager includes a receiving unit configured to receive user inputted information as to a structure of logical processors (LPs) and LPARs of the computing environment, a controller configured to monitor that the LPARs are configured to each access a share of processing resources of the LPs in accordance with the inputted information, a determining unit configured to determine an operational mode of each of the LPARs and any available amount of an excess of the share of the processing resources of the LPs, and a dispatching unit configured to dispatch the processing resources of at least a subset of the LPs having varying polarities to the LPARs in accordance with the respective predetermined shares and with respect to the determined operational mode of the respective LPARs and the amount, if any, of the excess share.

In accordance with another aspect of the invention, a method of operating an apparatus for use in a computing environment to run a variety of applications is provided. The method includes determining an operational mode of each logical partition (LPAR) of the apparatus, determining a share of processing resources of the logical processors (LPs) to be accessed by each of the LPARs, determining an amount of an excess of the share of the LPs, and dispatching the processing resources of at least a subset of the LPs to the LPARs in accordance with the respective predetermined shares and with respect to the determined operational mode of the respective LPARs and the amount, if any, of the excess share.

In accordance with yet another embodiment of the invention, an apparatus for use in a computing environment to run a variety of applications is provided. The apparatus includes one or more logical processors (LPs), one or more logical partitions (LPARs) configured to each access a share of processing resources of the LPs in accordance with predefined instructions, and an LPAR manager configured to determine an operational mode of each of the LPARs and any available amount of an excess of the share of the processing resources of the LPs and, with respect to a particular LPAR running in vertical mode, to dispatch the processing resources of at least a subset of the LPs to the LPAR such that, in order to account for the predetermined share of the LPAR and the amount, if any, of the excess share, none or a portion of the dispatched LPs run at substantially 100% of their respective processing capacities, a portion of the dispatched LPs run at a non-zero percentage of their respective processing capacities, and none or a portion of the dispatched LPs run at 0% of their respective processing capacities.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

U.S. patent application Ser. No. 11/972,741 "REAL-TIME CPU DISPATCHER AFFINITY RE-BALANCING" filed on the same day as the present invention, describes affinity re-balancing and is incorporated herein in its entirety by reference.

Figure 1:
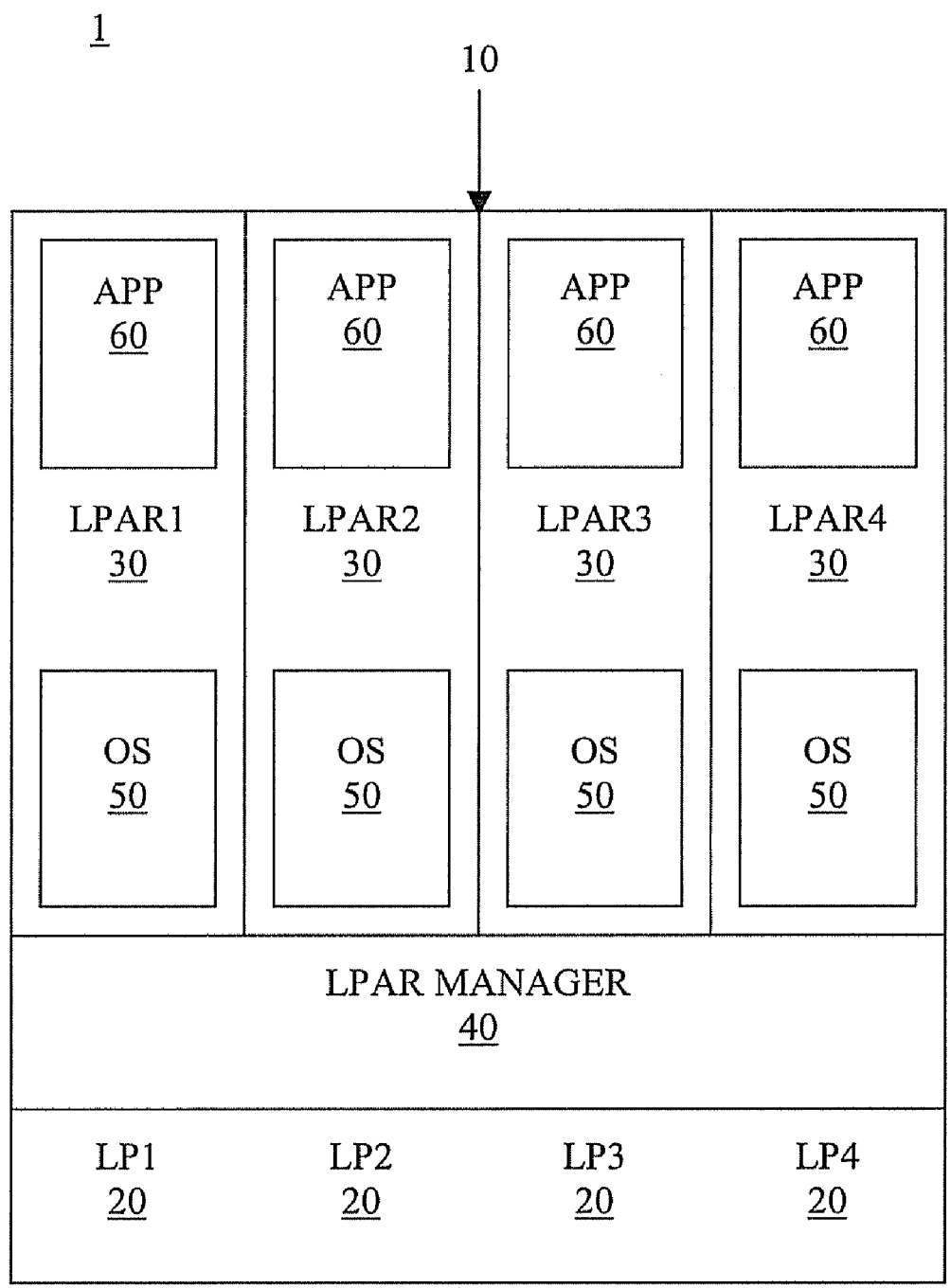
FIG. 1 is a schematic diagram illustrating a computing environment including logical partitions and logical processors in accordance with an embodiment of the invention.

With reference to FIG. 1, an apparatus 10 may be used in a computing environment 1 and may be employed to handle various types of computing requirements. As shown in FIG. 1, in an embodiment of the invention, the apparatus 10 comprises one or more logical processors (LP1-LP4) 20 and one or more logical partitions (LPAR1-LPAR4) 30. Each LPAR 30 is configured (e.g., with an assigned weight) such that each has access to a predetermined share of processing resources of the LPs 20 in accordance with predefined instructions. An LPAR manager 40 determines an operational mode of each of the LPARs 30 and an amount, if any, of an existing excess of the share of the processing resources of the LPs 20. Additionally, the LPAR manager 40 may dispatch the processing resources of at least a subset of the LPs 20, such as any of the LPs 20 that are defined as being shared rather than dedicated, to the LPARs 30 in accordance with the respective predetermined shares and with respect to the determined operational mode of the respective LPARs 30 and the amount, if any, of the excess share.

The LPs 20 may be physical processors that form that central processing unit of the apparatus 10 and which are dispatched to the LPARs 30 as noted above. In particular, the LPs 20 may be general processors, z Application Assist Processors (zAAPs), which are processors that are dedicated to certain types of work (e.g. Java applications), z9 Integrated Information Processors (zIIPs), or other similar processors. Moreover, the LPARs 30 may be virtually or actually specified with the LPAR manager (or the LPAR hypervisor) 40 being embodied as software installed on a general-purpose machine or as software installed on a specific type of machine within the apparatus 10.

In accordance with various embodiments of the invention, the apparatus 10 may contain different numbers of LPs 20 and LPARs 30. In particular, the apparatus 10 may contain many times as many LPs 20 than LPARs 30, where, in this case, each LPAR 30 has access to its respective share of the processing resources. Further, it is noted that the apparatus 10 may be a high-end computer, such as a server to which several users may connect. In that capacity, each of the LPARs 30 may operate as instructed by an operating system (OS) 50 installed therein to perform various applications APP 60. The OS 50 and the APP 60 may be either specifically designed for use with individual LPARs 30 or applicable to pluralities of LPARs 30.

According to aspects of the invention, when setting up the apparatus 10, a user initially configures the LPs 20 and the LPARs 30. The user may configure the apparatus 10 to have any number of LPARs 30 with each operating in variable modes and each having access to a configurable share of the processing resources of the LPs 20. Thus, as shown in the exemplary diagram of FIG. 2, an example of the apparatus 10 may comprise twenty LPs 20 of which a subset of ten LPs 20 will be dedicated (not shown) and ten LPs 20 will be shared. Further, first and second LPARs 30 will be configured to have access to a 75% share of the processing resources of the shared LPs 20 and a 25% share of the processing resources of the shared LPs 20, respectively.

In accordance with this example, the first and second LPARs 30 may be conventional in that they can only operate in horizontal mode. Alternatively, the first and second LPARs 30 may have the ability to selectively operate in the horizontal mode. In either case, if the first and second LPARs 30 each operate in horizontal mode, the first LPAR 30 will have access to 75% of the processing resources of each of the ten shared LPs 20 and the second LPAR 30 will have access to 25% of the processing resources of each of the ten shared LPs 20.

Figure 2:
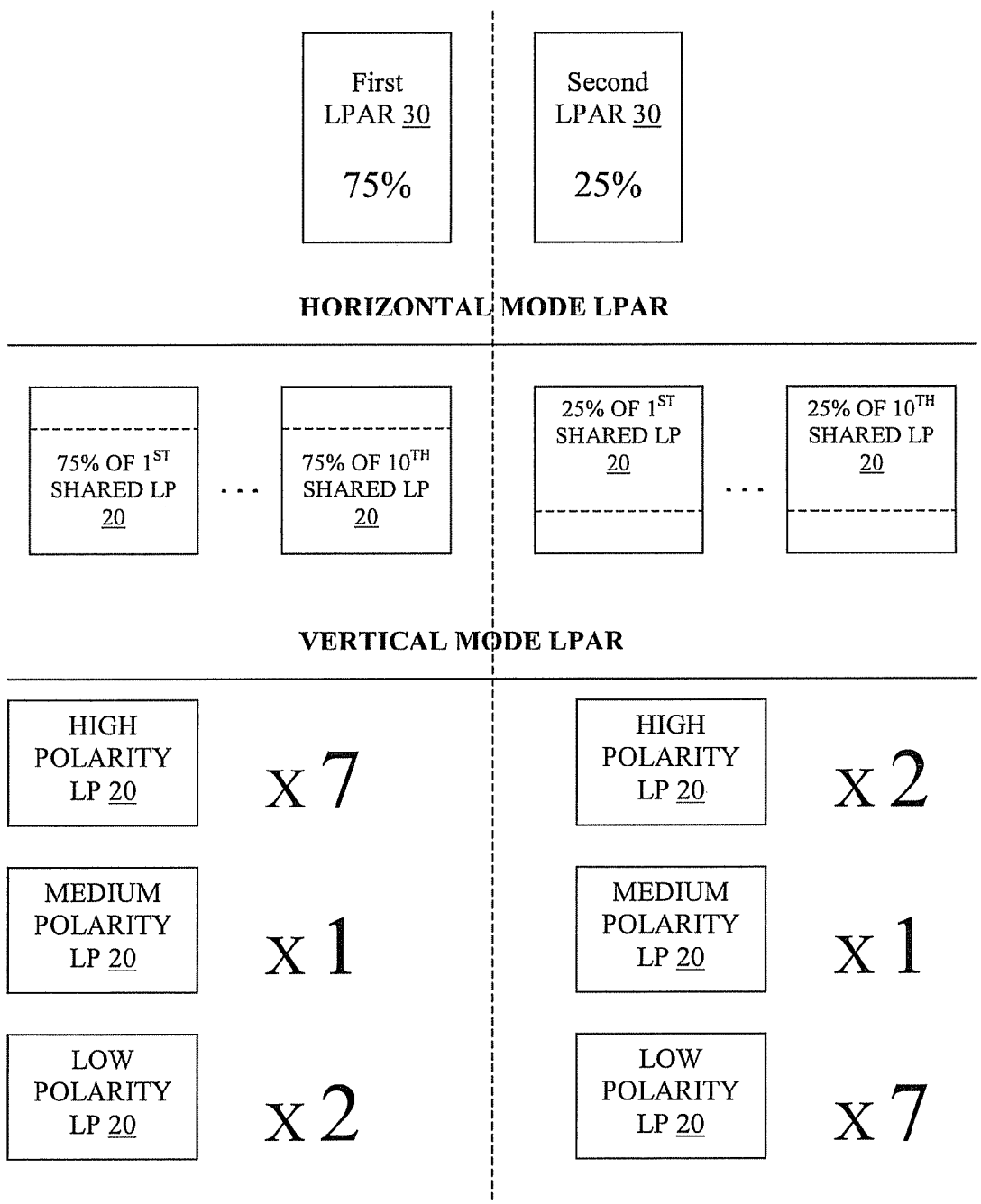
FIG. 2 is a diagram of a distribution to exemplary logical partitions running in horizontal and vertical modes in accordance with embodiments of the invention.

In contrast and with reference still to FIG. 2, if the first and second LPARs 30 are configured to operate in "vertical" mode, the first LPAR 30 will be assigned 7 high polarity LPs 20, 1 medium polarity LP 20 and 2 low polarity LPs 20 while the second LPAR 30 will be assigned 2 high polarity LPs 20, 1 medium polarity LP 20 and 7 low polarity LPs 20. Here, the polarity of the LPs 20 is defined as the ratio of an LPAR's current assigned weight to the number of LPs 20 having processing resources to which the respective LPAR 30 has access. That is, if a processing unit of each of the LPs 20 is an average maximum capacity of each of the LPs 20, the high polarity LPs initially operate at 100% of the processing unit, which in the example translates to 10% of the total workload of the first and second LPARs 30, the medium polarity LPs 20 initially operate at a non-zero percentage of the processing unit and the low polarity LPs 20 initially operate at 0% of the processing unit. Thus, it may be said that the polarity of a particular LP 20 refers to an amount of a processing capacity of the LP that is dedicated to allowing a particular LPAR 30, to which the LP 20 has been dispatched, access its respective share.

In accordance with an embodiment of the invention, the non-zero percentage of the processing unit at which the medium polarity LPs 20 operate is set at 50%. At this level, the medium polarity processors act as an "anchor" with sufficient weight reserved to allow the medium and low polarity LPs 20 to get dispatched, if necessary. Thus, in the example, if the first LPAR 30 were configured to have access to only 74% of each of the ten shared LPs 20 and the second LPAR 30 were configured to have access to 26% of each of the ten shared LPs 20, the first LPAR 30 will be assigned 6 high polarity LPs 20, 2 medium polarity LPs 20 and 2 low polarity LPs 20 while the second LPAR 30 will be assigned 2 high polarity LPs 20, 1 medium polarity LP 20 and 7 low polarity LPs 20. In this secondary example, the 2 medium polarity LPs 20 in the first LPAR 30 will each operate at 70% of their respective processing units while the medium polarity LP 20 in the second LPAR 30 will operate at 60% of the processing unit.

In any case and in accordance with aspects of the invention, the LPAR manager 40 will employ a new algorithm, which will be discussed below, to draw on the weight assigned to the medium and low polarity LPs 20. As such, within the LPARs 30, medium and low polarity LPs will have access to any existing excess share and high polarity LPs 20 will be able to give up physical resources to the medium and low polarity LPs 20 during excess cycles thereof. In other words, the LPAR manager 40 will be able to recognize the topology of the LPARs 30 and thereby exploit most if not all of the LPs 20.

Among the advantages provided by this configuration are flexibility with respect to increases in numbers of shared LPs 20 and the ability to perform LPAR 30 mode switching from vertical mode to horizontal mode and vice versa. Thus, in the first example, if an additional LP 20 comes on line (e.g., by one of the dedicated LPs 20 being converted to a shared LP 20), the first and second LPARs 30 may have access to 8 and 3 high polarity LPs 20, respectively, and may not be required to compete for computing resources. In this case, the first and second LPARs 30 may have the option to run in horizontal or vertical modes. Conversely, if one of the shared LPs 20 fails and the first and second LPARs 30 are forced to more heavily compete for computing resources, the first and second LPARs 30 will have medium and low polarity LPs 20 available for the competition when each runs in the vertical mode.

Figure 3:
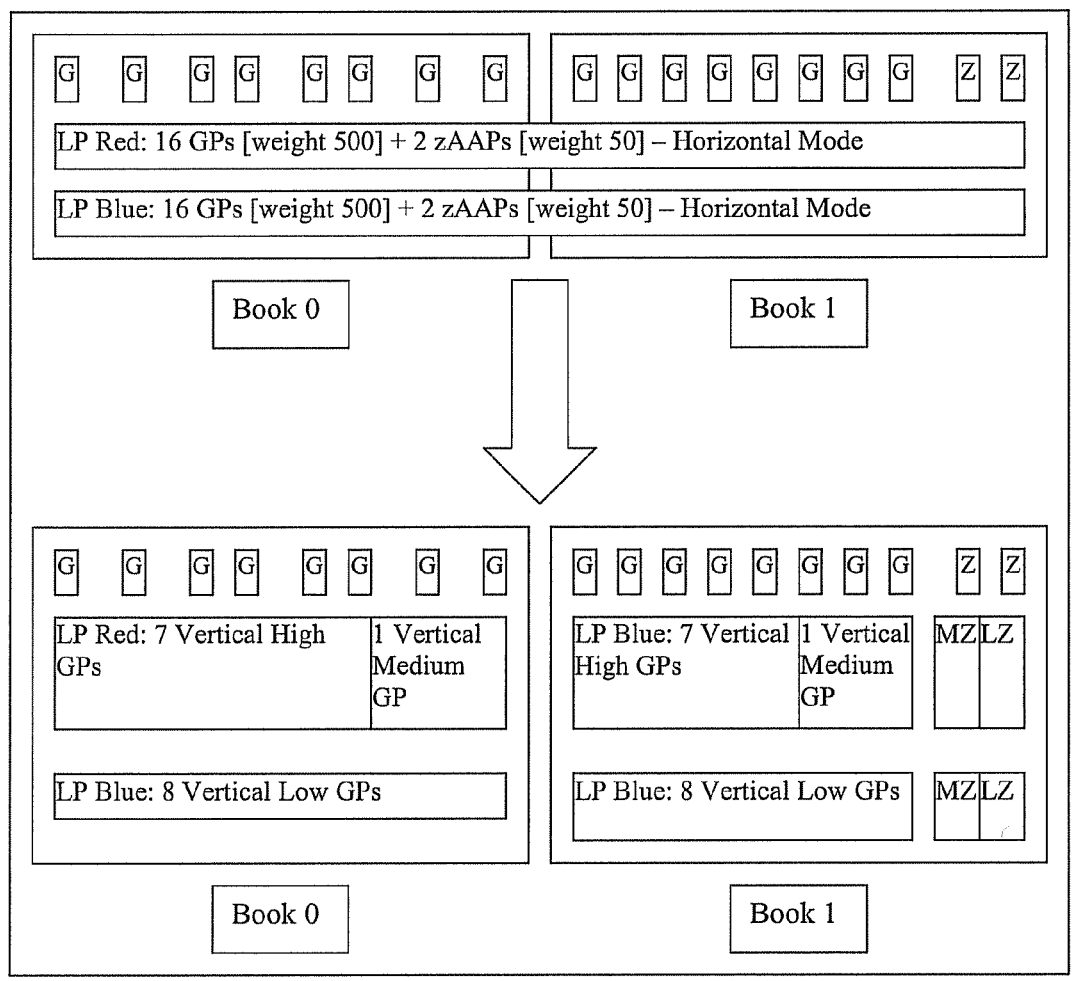
FIG. 3 is a diagram of results of configuring exemplary logical partitions to run in vertical mode in accordance with an embodiment of the invention.

With reference now to the examples illustrated in FIG. 3, it is noted that LPARs 30, to which several different types of LPs 20 are dispatched, may be configured to run in vertical mode. For these examples, the LPs 20 may include generic processors (GPs or G) and zAAPs (or Z), which is an application assist processor. Processor books, which are collections of physical processors, are numbered from left to right starting with 0.

In the example of FIG. 3, a server with 16 general purpose processors (G) and 2 zAAPs (Z) is shown in the top pictures as a 2 book system with 8 GPs in each book and 2 zAAPs in book 1. Each partition ("red" and "blue") is configured to run in horizontal mode and to thereby use all of the physical resources and equal weights. That is, the top pictures show the red and blue partitions running in conventional horizontal mode with each partition being entitled to an equal amount of the physical resources. The bottom pictures, however, show the effect of configuring the partitions to run in vertical mode. That is, partition red has been assigned 7 vertical high polarity GPs and 1 vertical medium polarity GP, all of which are located on book 0, and 8 vertical low polarity GPs, 1 vertical medium polarity zAAP and 1 vertical low polarity zAAP, all of which are located on book 1. Partition blue, on the other hand, has 7 vertical high polarity GPs, 1 vertical medium polarity GP, 1 vertical medium polarity zAAP and 1 vertical low polarity zAAP on book 1 and 8 vertical low polarity GPs on book 0.

Figure 4:
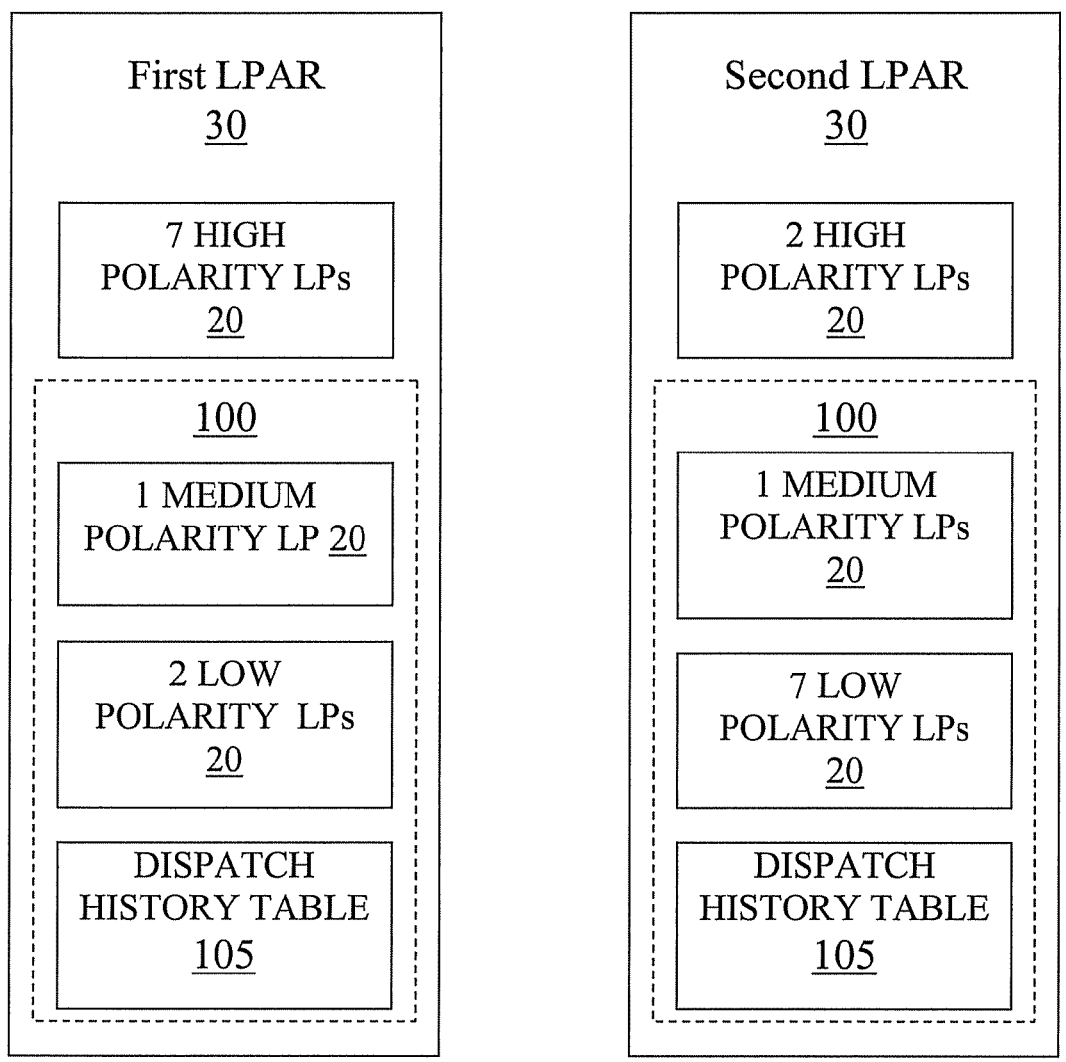
FIG. 4 is a schematic illustration of logical processors being included in exemplary share groups in accordance with embodiments of the invention.

With reference to FIG. 4, in accordance with further embodiments of the invention, the LPAR manager 40 forms a share group 100 including each of the medium and low polarity LPs 20 in the first and second LPARs 30. Thus, with respect to the first example described above, the share group 100 of the first LPAR 30 includes the 1 medium polarity LP 20 and the 2 low polarity LPs 20. Similarly, the share group 100 of the second LPAR 30 includes the 1 medium polarity LP 20 and the 7 low polarity LPs 20.

In general, the share group 100 allows for a management of the distribution of shares of the processing resources of the medium and low polarity LPs 20 where excess capacity is available to their respective LPAR 30 by allowing members of the share group 100 to pool their share and active times along with the high polarity LPs 20 of their respective LPAR 30. In this manner, the effective time and priority of each member of the share group 100 is based on an average share and an average active time of the share group 100 as a whole.

In an example, a three-way processor may have 3 LPARs 30 with each LPAR 30 having two LPs 20 with a weight of 50 each assigned thereto. In this example, the first LPAR 30, which runs in vertical mode, has 1 medium polarity LP 20 and 1 low polarity LP 20. Conversely, the second and third LPARs 30 each run in horizontal mode. Here, the share group 100 contains the medium and low polarity LPs 20 of the first LPAR 30. If the second LPAR 30 consumes its share of processing resources and the third LPAR 30 demands only 50% of its share, the low polarity LP 20 of the first LPAR 30, by virtue of its presence within the share group 100, would have limited access to the unused processing resources.

That is, if the medium polarity LP 20 of the first LPAR 30 comes to rest, the medium and low polarity LPs 20 of the first LPAR 30 will both have equal access to the excess share resulting from the third LPAR 30 not using its entire share. The dispatching of the medium and low polarity LPs 20 will be scheduled to be dispatched to use the excess share in a first-in first-out (FIFO) basis. Thus, the scheduling of the dispatching of the medium and low polarity LPs 20 in the FIFO basis allows the first LPAR 30 to expand into the excess share of the third LPAR 30.

Figure 5:
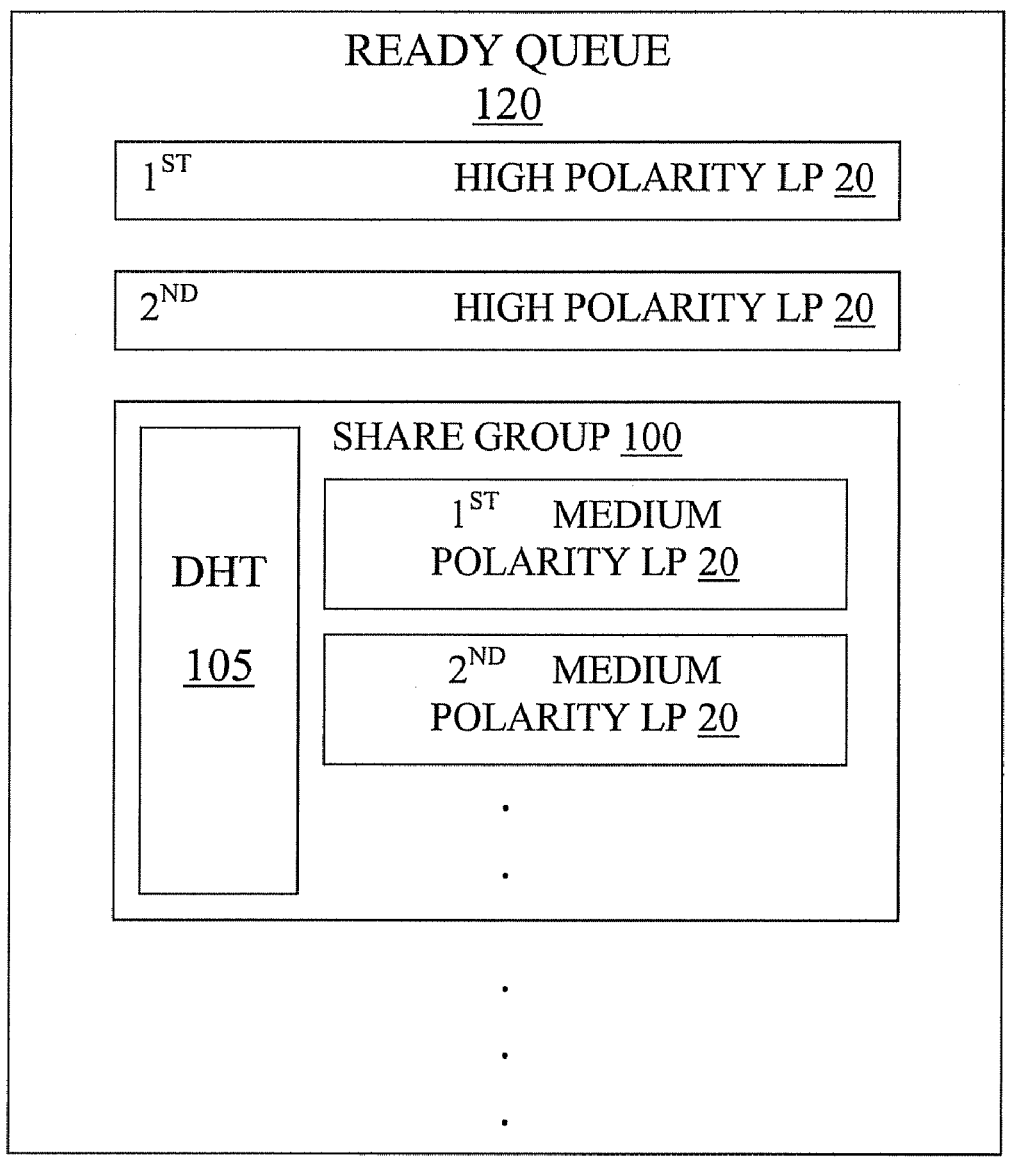
FIG. 5 is a diagram of an exemplary ready queue and an exemplary share queue in accordance with embodiments of the invention.

With reference now to FIG. 5, the dispatching and the scheduling of the medium and low polarity LPs 20 will be described. In accordance with embodiments of the invention, the members of the share group 100 are queued on a share group queue 110, from which the medium and low polarity LPs 20 are dispatched according to the FIFO basis. The shared group queue 110 is itself queued on a ready queue 120 along with the LPs 20 of the second and third LPARs 30 that are each ready to be dispatched.

With reference to FIGS. 4 and 5, it is noted that the formation of the share group 100 includes the formation of a dispatch history table 105 to serve as a storage location for average share and average dispatch time records relating to each of the LPs 20 within the share group 100 as well as any high polarity LPs 20 within the corresponding LPAR 30. The records may be employed in calculations of an LPAR 30 expansion ratio, effective times and priorities for the share group 100, generally, and for the LPs 20 of various polarities, individually.

In an embodiment of the invention, all of the medium and low polarity LPs 20 are able to use the share group 100 priority during the dispatching while the high polarity LPs 20 in the ready queue 120 are dispatched when they are ready with no consideration for the share group 100 statistics. Thus, while a high polarity LP 20 contributes its respective active time statistics to the share group 100 of its respective LPAR 30, it is not managed in any way based on the priority of the share group 100. Meanwhile, the medium and low polarity LPs 20 of the share group 100 receive benefits of the high polarity LP 20's statistics that they would not otherwise have. In other words, it is the ability of the share group 100 to draw on the priority of the high polarity LPs that allows the medium and low LPs in the share group 100 to fairly compete for excess capacity in the machine with other LPARs 30, especially with respect to LPs accessed by other LPARs 30 running in horizontal mode that may be competing for the same excess capacity.

As noted above, the medium and low polarity LPs 20 in a share group 100 are queued on a FIFO basis and are de-queued when they are dispatched. This means that each of the LPs 20 will be queued to the end of the queue when its dispatch interval ends. Since all LPs 20 dispatched via the share block 100 have the same priority, some imputed dispatch time needs to be used in priority calculations to a dispatching of several low polarity LPs 20 simultaneously. The imputed time will be the larger of the average CPU dispatch interval and one quarter of a dispatch time slice and will be stored in the dispatch history table 105.

In accordance with another embodiment of the invention, the LPAR manager 40 is configured to cap a distribution of the excess share to particular LPARs 30. This means that while excess share may be available to a particular LPAR 30, if an LPAR 30 is already operating at its full share, which is determined in accordance with the capping, the LPAR 30 will not be allowed to access the excess share.

Figure 6:
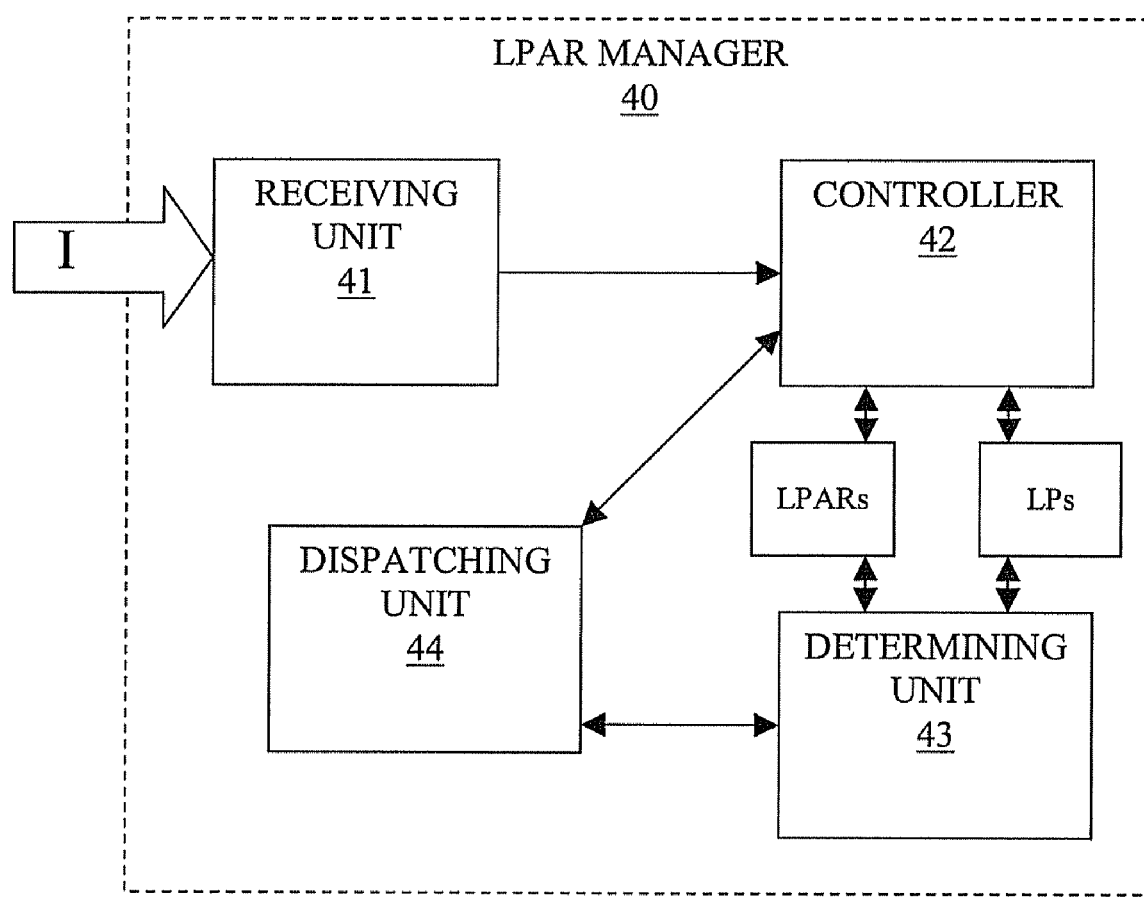
FIG. 6 is a schematic illustration of a logical partition manager in accordance with an embodiment of the invention.

With reference to FIG. 6, in accordance with another aspect of the invention, it is understood that a logical partition (LPAR) manager 40 may operate in various computing environments. As such, the LPAR manager 40 may have various components and particular utilities. In particular, the LPAR manager 40 may include a receiving unit 41 to receive user inputted information, I, as to a structure of LPs and LPARs within the computing environment and a controller 42 to monitor that the LPARs are configured to each access a share of processing resources of the LPs in accordance with the inputted information, I. A determining unit 43 may determine an operational mode (e.g., vertical or horizontal) of each of the LPARs 30 and an amount of an excess of the share of the processing resources of the LPs 20. Lastly, a dispatching unit 44 may dispatch the processing resources of at least a subset of the LPs 20, such as the shared LPs 20, to the LPARs 30 in accordance with the respective predetermined shares and with respect to the determined operational mode of the respective LPARs 30 and the amount, if any, of the excess share.

Figure 7:
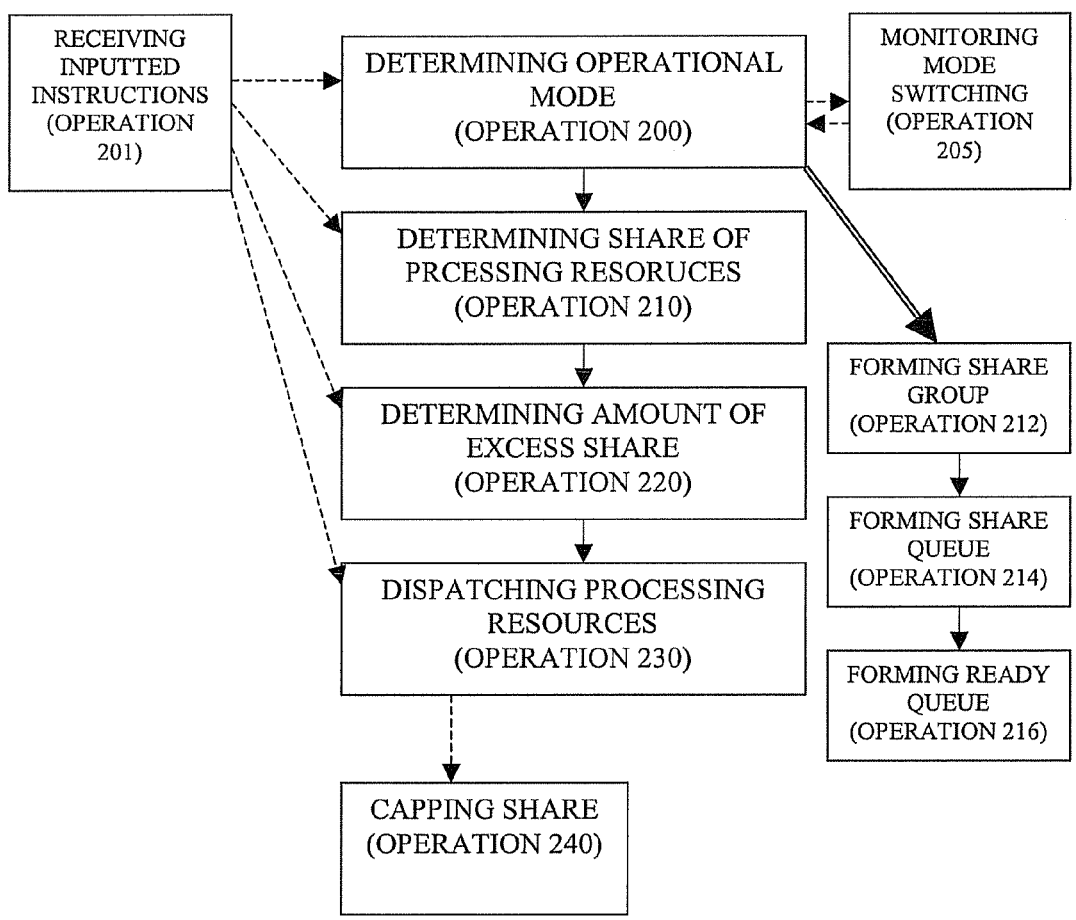
FIG. 7 is a flow diagram of a method of operating a logical partition in accordance with an embodiment of the invention.

With reference now to FIG. 7, in accordance with another aspect of the invention, a method of operating an apparatus for use in a computing environment to run a variety of applications includes determining an operational mode of each logical partition (LPAR) of the apparatus (operation 200), determining a share of processing resources of the logical processors (LPs) to be accessed by each of the LPARs (operation 210), determining an amount of an excess of the share of the LPs (operation 220), and dispatching the processing resources of at least a subset of the LPs having varying polarities to the LPARs in accordance with the respective predetermined shares and with respect to the determined operational mode of the respective LPARs and the amount, if any, of the excess share (operation 230).

In an embodiment of the invention, the method further comprises receiving an input of instructions as to the share of the processing resources of the LPs to be accessed by each of the LPARs (operation 201). Here, the operation of receiving the input of instructions may occur prior to, during or after any of the operations 200-230.

The determining of the operational mode of each LPAR in operation 200 comprises determining whether a particular LPAR operates in a horizontal mode, in which the shares to be accessed by the LPARs are dispatched evenly to a subset of the LPs, such as the shared LPs, and determining whether the particular LPAR operates in a vertical mode. In vertical mode, as noted above, the accessed share is distributed to one or more high polarity LPs within the subset, one or more medium polarity LPs within the subset and one or more low polarity LPs within the subset. As an additional matter, operation 200 may further include determining whether the operational mode of the particular LPAR switches from the horizontal mode to the vertical mode and vice versa (operation 205).

Where an LPAR is found to operating in vertical mode, subsequent to the determining of the share in operation 210, the method further comprises forming a share group (operation 212) of each of the LPs in the LPAR to be employed as medium and low polarity LPs. Once the share group is formed in operation 212, the method next comprises forming a share queue (operation 214), in which the medium and low polarity LPs are queued to have the excess share distributed thereto, and forming a ready queue (operation 216) in which the high polarity LPs are queued to have the excess share distributed thereto.

As an additional matter, the method may also comprise distributing the excess share to the LPs in the share queue. Here, the excess share is distributed to the LPs in the share group on a first-in first-out (FIFO) basis. This FIFO basis may be adjusted with respect to a dispatching time imputed to each of the LPs in the share queue.

In accordance with another embodiment of the invention, the method may further comprise capping a distribution of the share to be accessed by particular LPARs (operation 240).

With reference back to FIGS. 1-3, in accordance with yet another embodiment of the invention, an apparatus 10 for use in a computing environment 1 runs a variety of applications 60 is provided. The apparatus 10 includes one or more logical processors (LPs) 20, one or more logical partitions (LPARs) 30 configured to each access a share of processing resources of the LPs 20 in accordance with predefined instructions, and an LPAR manager 40 configured to determine an operational mode of each of the LPARs 30 and any available amount of an excess of the share of the processing resources of the LPs 20 and, with respect to a particular LPAR 30 running in vertical mode, to dispatch the processing resources of at least a subset of the LPs 20 to the LPAR 30 such that, in order to account for the predetermined share of the LPAR 30 and the amount, if any, of the excess share, none or a portion of the dispatched LPs 20 run at substantially 100% of their respective processing capacities, a portion of the dispatched LPs 20 run at a non-zero percentage of their respective processing capacities, and none or a portion of the dispatched LPs 20 run at 0% of their respective processing capacities Thus, where a particular LPAR 30 runs in vertical mode the bulk of the assigned share for the LPAR 30 is packed into a few high priority LPs 20 running at substantially 100% of their capacities. As discussed above, this is in contrast to the situation in which the LPAR 30 runs in horizontal mode where the assigned share is spread to all of the LPs 20 running at substantially less than their capacities.

With reference to FIG. 3, it may be seen that, where the LPAR 30 runs in vertical mode, the LPAR 30 will be more efficient. That is, the presence of the medium and low priority Ls 20 allows for expansion of processing resources into the excess (e.g., unused) share, if any, of the other LPARs 30. Here, even if no excess share is available, it is noted that an LPAR 30 running in horizontal mode will still be more efficient than it would be running in horizontal mode.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. An apparatus for use in a computing environment to run a variety of applications, the apparatus comprising:
   one or more logical processors (LPs) comprising physical processors that form a central processing unit;
   one or more logical partitions (LPARs) configured to each access a predetermined share of processing resources of the LPs in accordance with predefined instructions, each LPAR being configured to operate in a horizontal mode or a vertical mode and to perform operational mode switching; and
   an LPAR manager configured to determine an operational mode of each of the LPARs by determining whether each of the LPARs is operating in the horizontal mode or the vertical mode and to determine any available amount of an excess of the share of the processing resources of the LPs,
   the LPAR manager being further configured to dispatch the processing resources of at least a subset of the LPs to the LPARs in accordance with the respective predetermined shares of each of the LPARs, with respect to the determined operational mode of each of the LPARs and with respect to the amount, if any, of the excess share of the processing resources of the LPs,
   wherein, in the horizontal mode, an accessed share of processing resources of the LPs is distributed evenly among the subset and, in the vertical mode, the accessed share is distributed to zero, one or more high polarity LPs within the subset, one or more medium polarity LPs within the subset and zero, one or more low polarity LPs within the subset, and wherein operational mode switching from the horizontal mode to the vertical mode and vice versa is performed during use of the apparatus.

2. The apparatus according to claim 1, wherein the predefined instructions are user defined.

3. The apparatus according to claim 1, wherein the subset of the LPs comprises shared LPs.

4. The apparatus according to claim 1, wherein the high polarity LPs are configured to provide 100% of their respective processing resources to the LPAR to which they are dispatched, the medium polarity LPs are configured to provide a non-zero percentage of their respective processing resources to the LPAR to which they are dispatched and the low polarity LPs are configured to provide 0% of their respective processing resources to the LPAR to which they are dispatched.

5. The apparatus according to claim 4, wherein the non-zero percentage is 50% of the processing resources of the corresponding LP.

6. The apparatus according to claim 1, wherein the LPAR manager forms a share group of each of the medium and low polarity LPs, a share queue in which the medium and low polarity LPs are queued and a ready queue in which the high polarity LPs are queued to have the assigned share distributed thereto.

7. The apparatus according to claim 6, wherein the assigned share is distributed to the high polarity LPs in the ready queue first and the assigned share and excess share to the LPs in the share group secondarily, and wherein the assigned share and excess share are distributed to the LPs in the share group on a first-in first-out (FIFO) basis.

8. The apparatus according to claim 7, wherein the LPAR manager generates a dispatch table including dispatch information, and wherein the FIFO basis is subject to a dispatching time calculated from the dispatch information, which is imputed to each of the LPs in the share queue.

9. The apparatus according to claim 6, wherein all of the LPARs are configured to separately operate in the horizontal mode and/or the vertical mode.

10. The apparatus according to claim 9, wherein the share group contains each medium and low polarity LP of each of the LPARs running in vertical mode and the excess share is distributed to the LPs of the share group and the LPs of each of the LPARs running in horizontal mode evenly.

11. The apparatus according to claim 1, wherein the LPAR manager is configured to cap a distribution of the accessed share to particular LPARs.

12. A logical partition (LPAR) manager for use in a computing environment in which LPARs are defined, each LPAR being configured to operate in a horizontal mode or a vertical mode and to perform operational mode switching, the LPAR manager comprising:
   a receiving unit configured to receive user inputted information as to a structure of logical processors (LPs) comprising physical processors that form a central processing unit and LPARs of the computing environment;
   a controller configured to monitor that the LPARs are configured to each access a share of processing resources of the LPs in accordance with the inputted information;
   a determining unit configured to determine an operational mode of each of the LPARs by determining whether each of the LPARs are operating in the horizontal mode or the vertical mode and to determine any available amount of an excess of the share of the processing resources of the LPs; and
   a dispatching unit configured to dispatch the processing resources of at least a subset of the LPs having varying polarities to the LPARs in accordance with the respective predetermined shares, with respect to the determined operational mode of the respective LPARs and with respect to the amount, if any, of the excess share,
   wherein, in the horizontal mode, an accessed share of processing resources of the LPs is distributed evenly among the subset and, in the vertical mode, the accessed share is distributed to zero, one or more high polarity LPs within the subset, one or more medium polarity LPs within the subset and zero, one or more low polarity LPs within the subset, and wherein operational mode switching from the horizontal mode to the vertical mode and vice versa is performed during the use of the computing environment.

13. A method of operating an apparatus for use in a computing environment to run a variety of applications, the method comprising:
   determining an operational mode of each logical partition (LPAR) of the apparatus, each LPAR being configured to operate in a horizontal mode or a vertical mode and to perform operational mode switching and the determining comprising determining whether each LPAR is operating in the horizontal mode or the vertical mode,
   wherein the determining of the operational mode of each LPAR comprises determining whether a particular LPAR operates in the horizontal mode, determining whether the particular LPAR operates in the vertical mode and determining whether the operational mode of the particular LPAR switches from the horizontal mode to the vertical mode and vice versa;
   determining a share of processing resources of the logical processors (LPs) to be accessed by each of the LPARs;
   determining an amount of an excess of the share of the LPs; and dispatching the processing resources of at least a subset of the LPs to the LPARs in accordance with the respective predetermined shares of each of the LPARs, with respect to the determined operational mode of the respective LPARs and with respect to the amount, if any, of the excess share.

14. The method according to claim 13, further comprising receiving an input of instructions as to the shares to be accessed by each of the LPARs.

15. The method according to claim 13, wherein the subset of the LPs comprises shared LPs.

16. The method according to claim 13, wherein the dispatching to an LPAR running in vertical mode comprises:
dispatching zero, one or more high polarity LPs to the LPAR, which are configured to provide 100% of their respective processing resources to the LPAR;
dispatching one or more medium polarity LPs to the LPAR, which are configured to provide a non-zero percentage of their respective processing resources to the LPAR; and
dispatching zero, one or more low polarity LPs to the LPAR, which are configured to provide 0% of their respective processing resources to the LPAR.

17. The method according to claim 16, further comprising setting the non-zero percentage at 50% of the processing resources of the LP.

18. The method according to claim 13, further comprising:
forming a share group of each of the medium and low polarity LPs;
forming a share queue in which the medium and low polarity LPs are queued; and
forming a ready queue in which the high polarity LPs are queued.

19. The method according to claim 18, further comprising:
distributing the assigned share to the high polarity LPs in the ready queue first; and
distributing the assigned share and excess share to the LPs in the share queue secondarily, wherein the excess share is distributed to the LPs in the share group on a first-in first-out (FIFO) basis.

20. The method according to claim 19, further comprising adjusting the FIFO basis with respect to a dispatching time imputed to each of the LPs in the share queue.

21. The method according to claim 13, further comprising capping a distribution of the shares to be accessed by particular LPARs.

22. An apparatus for use in a computing environment to run a variety of applications, the apparatus comprising:
one or more logical processors (LPs) comprising physical processors that form a central processing unit;
one or more logical partitions (LPARs) configured to each access a share of processing resources of the LPs in accordance with predefined instructions, each LPAR being configured to operate in a horizontal mode or a vertical mode and to perform operational mode switching; and
an LPAR manager configured to determine an operational mode of each of the LPARs by determining whether each of the LPARs is operating in the horizontal mode or the vertical mode and to determine any available amount of an excess of the share of the processing resources of the LPs and, with respect to a particular LPAR running in vertical mode, to dispatch the processing resources of at least a subset of the LPs to the LPAR such that, in order to account for the predetermined share of the LPAR and the amount, if any, of the excess share:
none or a portion of the dispatched LPs run at 100% of their respective processing capacities,
a portion of the dispatched LPs run at a non-zero percentage of their respective processing capacities, and
none or a portion of the dispatched LPs run at 0% of their respective processing capacities,
wherein, in the horizontal mode, an accessed share of processing resources of the LPs is distributed evenly among the subset and, in the vertical mode, the accessed share is distributed to zero, one or more high polarity LPs within the subset, one or more medium polarity LPs within the subset and zero, one or more low polarity LPs within the subset, and wherein operational mode switching from the horizontal mode to the vertical mode and vice versa is performed during use of the apparatus.

* * * * *